US011153299B2

(12) United States Patent
Gray et al.

(10) Patent No.: US 11,153,299 B2
(45) Date of Patent: Oct. 19, 2021

(54) SECURE DATA TRANSPORT USING TRUSTED IDENTITIES

(71) Applicant: INTERNATIONAL BUSINESS MACHINES CORPORATION, Armonk, NY (US)

(72) Inventors: Michael W. Gray, Guanaba (AU); Narayana A. Madineni, Southport (AU); Simon D. McMahon, GoldCoast (AU); Leigh S. McLean, Nerang (AU); Luvita Burgess, Carina (AU); Stephen J. McKenzie, Mudgeeraba (AU); Matthew Green, Canberra (AU); Peter T. Waltenberg, Gold Coast (AU)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 16/297,830

(22) Filed: Mar. 11, 2019

(65) Prior Publication Data

US 2020/0296086 A1 Sep. 17, 2020

(51) Int. Cl.
*H04L 29/06* (2006.01)
*H04L 9/32* (2006.01)
*H04L 9/08* (2006.01)

(52) U.S. Cl.
CPC .......... *H04L 63/0823* (2013.01); *H04L 9/085* (2013.01); *H04L 9/0877* (2013.01); *H04L 9/3247* (2013.01); *H04L 9/3263* (2013.01)

(58) Field of Classification Search
CPC . H04L 63/0823; H04L 9/3247; H04L 9/0877; H04L 9/3263; H04L 9/085; H04L 9/088; H04L 9/0891; H04L 9/0897; H04L 9/006; H04L 9/0822; H04L 9/0825; H04L 2463/081; H04L 2463/062; H04L 63/061; H04L 63/0428
USPC ........................................................ 713/156
See application file for complete search history.

(56) References Cited

U.S. PATENT DOCUMENTS

| 7,181,620 | B1 * | 2/2007 | Hur ......................... H04L 9/083 713/168 |
| 9,112,681 | B2 | 8/2015 | Kotani et al. |
| 9,124,563 | B2 | 9/2015 | Castillo et al. |
| 9,219,730 | B2 | 12/2015 | D'Souza |

(Continued)

OTHER PUBLICATIONS https://docs.microsoft.com/en-us/azure/key-vault/key-vault-hsm-protected-keys, "How to generate and transfer HSM-protected keys for Azure Key Vault", Aug. 27, 2018, 23 pages.

(Continued)

*Primary Examiner* — Kambiz Zand
*Assistant Examiner* — Aubrey H Wyszynski
(74) *Attorney, Agent, or Firm* — Ewa M. Wozniak

(57) ABSTRACT

A method, computer system, and a computer program product for secure transport of data is provided. The present invention may include defining a trust relationship based on a secret. The present invention may also include associating a trusted transport key identity (TTKI) based on the defined trust relationship. The present invention may then include receiving a trusted transport key (TTK), wherein the TTK is digitally signed and encrypted with the TTKI. The present invention may further include verifying the digitally signed TTK. The present invention may also include enveloping the secret with the TTK.

20 Claims, 6 Drawing Sheets

(56) References Cited

U.S. PATENT DOCUMENTS

| | | | |
|---|---|---|---|
| 9,686,077 B2 | 6/2017 | Raj et al. | |
| 9,774,573 B2 | 9/2017 | Hitchcock et al. | |
| 2008/0077794 A1* | 3/2008 | Arnold ................. | H04L 9/0822 |
| | | | 713/169 |
| 2010/0310075 A1* | 12/2010 | Lin ................. | G11B 20/00224 |
| | | | 380/278 |
| 2010/0310076 A1* | 12/2010 | Barzilai ............. | H04L 63/0485 |
| | | | 380/278 |

OTHER PUBLICATIONS http://docs.oasis-open.org/pkcs11/pkcs11-base/v2.40/pkcs11-base-v2.40.pdf, "PKCS #11 Cryptographic Token Interface Base Specification Version 2.40", QASIS Standard, Apr. 14, 2015, 138 pages.
Mell et al., "The NIST Definition of Cloud Computing", Recommendations of the National Institute of Standards and Technology, Special Publication 800-145, Sep. 2011, 7 pages.

* cited by examiner

SECURE DATA TRANSPORT USING TRUSTED IDENTITIES

BACKGROUND

The present invention relates generally to the field of computing, and more particularly to data security. Storing sensitive data in a secure environment may include transporting the data from one location to a different location. Sensitive data may be routinely transmitted for backup operations or for distribution operations. Transport keys may be used to transmit sensitive data, such as encryption and decryption keys, however, transport keys may not be controlled by the owner of the sensitive data.

SUMMARY

Embodiments of the present invention disclose a method, computer system, and a computer program product for secure transport of data. Embodiments of the present invention may include defining a trust relationship based on a secret. Embodiments of the present invention may also include associating a trusted transport key identity (TTKI) based on the defined trust relationship. Embodiments of the present invention may then include receiving a trusted transport key (TTK), wherein the TTK is digitally signed and encrypted with the TTKI. Embodiments of the present invention may further include verifying the digitally signed TTK. Embodiments of the present invention may also include enveloping the secret with the TTK.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
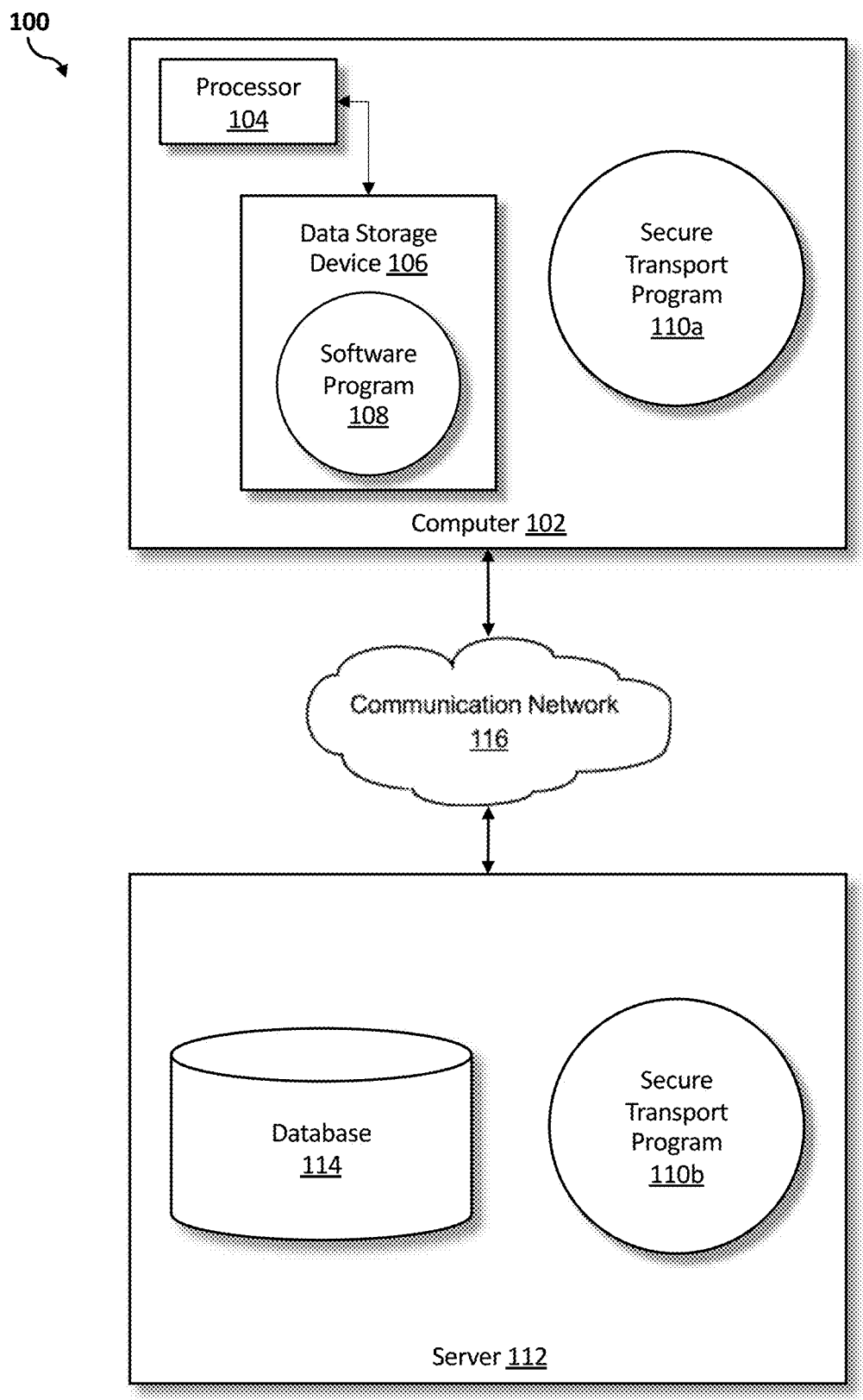
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method and program product for secure transport of secrets. As such, the present embodiment has the capacity to improve the technical field of data security by allowing the owner of sensitive data to control who may access the sensitive data. More specifically, the owner of sensitive data can create a secret and define trust relationships by associating a trusted transport key issuer (i.e., TTKI, trusted TKI or trust anchor) with the created secret. Enveloping the secret with an external key may secure the secret such that a database administrator may not access the enveloping key, the secret or the sensitive data. An external key may also be known as a transport key or an extraction key.

As previously described, storing sensitive data in a secure environment may include transporting the sensitive data from one location to a different location. Sensitive data may be routinely transmitted for backup operations or for distribution operations. Transport keys may be used to secure sensitive data or secret data for transmission, however, transport keys may not be controlled by the owner (i.e., the user, the creator, the storer or the originator) of the sensitive data.

The sensitive data may include restricted data, confidential data, secure data or personal data. Secret data (i.e., secrets) may include data used to encrypt or decrypt messages and to provide extra security measures to sensitive data being transported over a network. The secret data may be related to and include, for example, a secret key, a private key, encryption keys, decryption keys, exporter keys or other data created by a user to further protect the transport of data and the transport of keys. An exporter key may include a key that is transmitted from the user device. Secret data may also be considered sensitive data. Cryptographic keys, such as symmetric keys or asymmetric keys, may be used to provide security to sensitive data. A symmetric key may use one key for both the encryption and the decryption of data. An asymmetric key may use two separate keys for the encryption and the decryption of data.

Secret data, such as secret keys, symmetric keys or private asymmetric keys, stored on a secure network environment or stored on computing devices may be routinely transported (i.e., transmitted) for backup, management and distribution operations, such as a key backup, a key management or a key distribution operation. To securely perform the transmission of secret data, a transport key may be used to envelop (i.e., encapsulate) the secret data. Although the transport keys may secure the secret data for transmission, for example, when a user is obtaining access to the user sensitive data on a secure network, the transport key may not be controlled by the secret data owner or creator. For example, an administrator of a hardware security module (HSM) has access to a secure database that stores a private key for clients and the HSM administrator may, without authorization, access, compromise and export the private key to then have the ability to access sensitive data protected by the private key.

A transport key may include a key that may be used to encrypt another key (e.g., a symmetric key or an asymmetric private key) or used to encrypt the secret data for transport across a transport network (e.g. an insecure transport network). A transport key may also use key wrapping algorithms to encapsulate or encrypt cryptographic key material that is stored in an untrusted database or transmitted over an untrusted network.

Cryptographic key management systems may store (i.e., backup), transmit, generate or delete (i.e., shred or destruct) cryptographic keys. The security of secret data stored on a HSM may be vulnerable depending on the key management system, the management of the encrypted secret data and the transport key security. If an unauthorized person were to obtain a transport key, the secret data and the sensitive data may be decrypted and accessed without the consent of the owner or creator of the sensitive data.

Therefore, it may be advantageous to, among other things, control the transport key creation in a key management system by designating an extra level of security and by associating the transport keys with the secret data created by the user. The association of secret data with transport keys may be created, for example as a security policy, and made in advance of the creation and use of transport keys while allowing flexibility of key transport options within the confines of a present security policy.

According to at least one embodiment, a trusted transport key may be created such that the secret data owner may specify which transport keys to trust for enveloping operations. A trusted transport key may include a key that has been acknowledged by the secret data owner as a trusted key. For example, a standard public key infrastructure (PKI) practice may be used such that the transport keys are used for enveloping operations to transport sensitive data out of a secure network environment. PKI signatures (i.e., PKI digital signatures) may be used to verify that the transport key is trusted for use with a set of associated application secrets. The associated application secrets may be created by secret data owner.

Typical key management practices allow an HSM administrator to access and export the stored secret data and sensitive data by allowing the HSM administrator access to the transport keys. With access to the transport keys, the HSM administrator may decrypt the secret data, such as a user private key, and the decrypted secret data may allow access to underlying user sensitive data. The present embodiment may allow the owner of the secret data to determine who may export the secret data or who may have access to the trusted transport key. Typically, the user device or the HSM device may give broad access to the administrator, however an implementation of a secure transport program may remove administrator access on the user device or the HSM device. For example, a smart phone or a small HSM device with designated trusted transport secrets for a user may not allow a system administrator to obtain, use or export the secret data.

Embodiments of the present invention may provide a secure private key, such as a personal secret, migration between HSMs and the personal computing devices by using a transport key determined by the private key owner (i.e., secret data owner) as opposed to a transport key determined by an administrator of the HSMs and personal devices.

Trust relationships may be defined during transport key creation (i.e., secret data creation). The transport key (i.e., enveloping key) may be signed either directly or indirectly, following normal PKI trust path chain rules, by a TTKI associated with the secret data. Transport keys may be associated with secret data using trust relationships. Trust relationships are created between transport keys and secret data to be transferred. A trusted transport key issuer may create a secret and explicitly identify whom the secret may be trusted for the issuance of transport keys.

Advantages to creating trust relationships during transport key creation for enveloping operations may include that the owner (i.e., creator or user) controls can be applied on what secrets may be enveloped by which keys. Enveloping operations may include key wrapping or key encapsulation to encapsulate or encrypt sensitive data that may be stored on an untrusted communication network. Allowing an owner to identify a particular enveloping key to trust with a particular secret creates a higher level of security for sensitive data to be stored and transported.

Secrets may be partitioned by associating with TTKIs (i.e., in addition to or distinguished by attribute matching). The secrets may be organized internally by the TTKI as opposed to organized by a secure object.

New enveloping keys may be introduced as needed by having an associated TTKI sign (i.e., directly or indirectly) the enveloping key. For example, aged keys may be replaced periodically. Aged keys may also be replaced based on the number of times the keys have been used, such as the number of times a key was used to export sensitive data. Additionally, as a further example, a key may be replaced after a single use that may act as a forward secrecy provision such that an unauthorized decryption of the key may not allow the unauthorized person access to the secret data or the sensitive data. The ability to introduce new enveloping keys allows the creator of the secret the ability to update and refresh keys.

Transport key security constraints may be established when the key is certified as opposed to when the key is installed on the device. For example, the TTKI issues keys to be used only for the transport of secret keys and the device will only use the issue keys for transport of secret keys.

A secure data transport example using trusted law enforcement identities may include configuring a computing device with law enforcement capabilities. The device, when initialized, contains a TTKI of the law enforcement office for which only the law enforcement office has access to the stored private key. When required by law enforcement to obtain a user secret, the law enforcement office may offer the computing device a key signed by the law enforcement TTKI. With the key signed by the law enforcement TTKI, the user secret may be extracted.

One or more TTKIs may be associated with the secret. For example, the TTKI may be validated by a normal public key infrastructure (PKI) and a subject name, such as a distinguished name (DN), then the TTKI is the trusted certificate authority that is explicitly trusted. An alternate embodiment may provide flexibility to include preconfiguring the trusted issuer of transport keys to a device, creating an implicit trust as opposed to an explicit trust. Implicit trust may include, for example, the trust of the law enforcement TTKI previously described. As an additional example, an implicit trust may include the trust of a system owner, such as in an employment scenario when an employee may need to extract the user key from an employer owned device for work related projects and duties.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a secure transport program 110a. The networked computer environment 100 may also include a server 112 that is enabled to run a secure transport program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the secure transport program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the secure transport program 110a, 110b (respectively) to securely transport secret data across a network. The secure transport method is explained in more detail below with respect to FIGS. 2 and 3.

Figure 2:
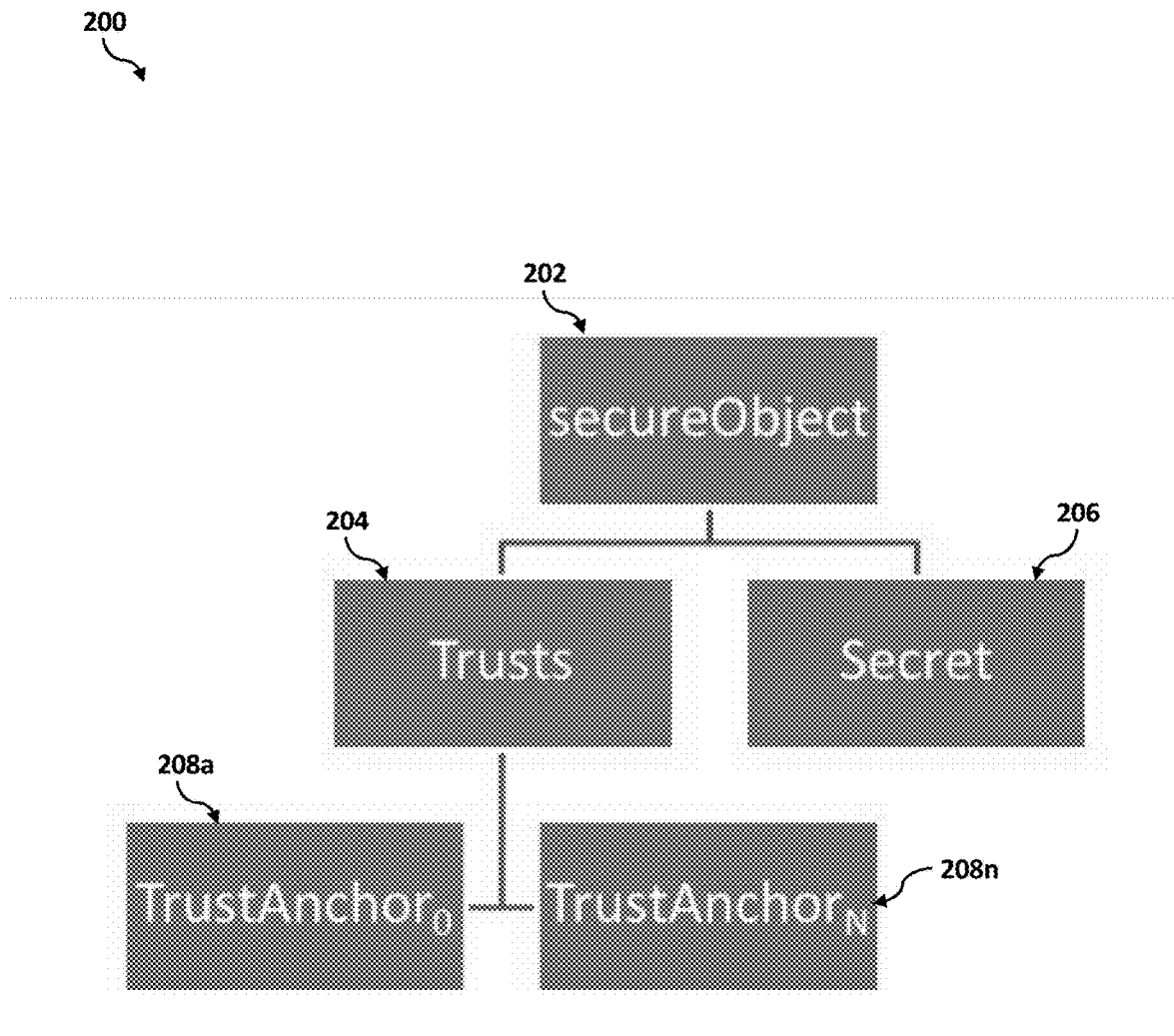
FIG. 2 is a block diagram of an example implementation of enveloping a secure object using trust relationships according to at least one embodiment.

Referring now to FIG. 2, a block diagram of an example implementation of enveloping a secure object using trust relationships 200 used by the secure transport program 110a, 110b according to at least one embodiment is depicted.

In this example, a public-key cryptography standard PKCS11 is modified to enhance the PKCS11 standard operation to recognize a secure object. A PKCS11 may include an independent platform, such as an HSM, to create cryptographic tokens. A secure object may include, for example, metadata, encrypted data or verification tags. A secureObject 202 may be stored on a device (e.g., smart phone, tablet or personal computer). The secureObject 202 may be used in the envelop process. Trust relationships may be formed by a user when assigning a secret 206 to a transport key (tk). Trust relationships (e.g, trusts 204) may be established for a given secret 206 using TrustAnchors$_{0-N}$ 208$_{a-n}$ (i.e., trusted TKI).

An example process of validating and using a transport key (tk) to encrypt and envelop secret data (s) (e.g., secret 206) using encryption mechanism E is presented below.

```
For each secureObject (sO) on the device
    If (S is in sO.PKCS11Objects)
        For each certificate (c) in sO.trusts
            If (is signedBy(tk, c))
                Return Etk(s)
            End If
        End For
        Report failure for s for transport key tk
    End If
End For
```

To transport the secret 206 using the transport key (tk), the secure transport program 110a, 110b may scan all secureObject 202 definitions to find a record for the secret 206 to identify if the transport key (tk) is valid for the secureObject 202. All available secureObjects 202 may be scanned before reporting a failure.

Figure 3:
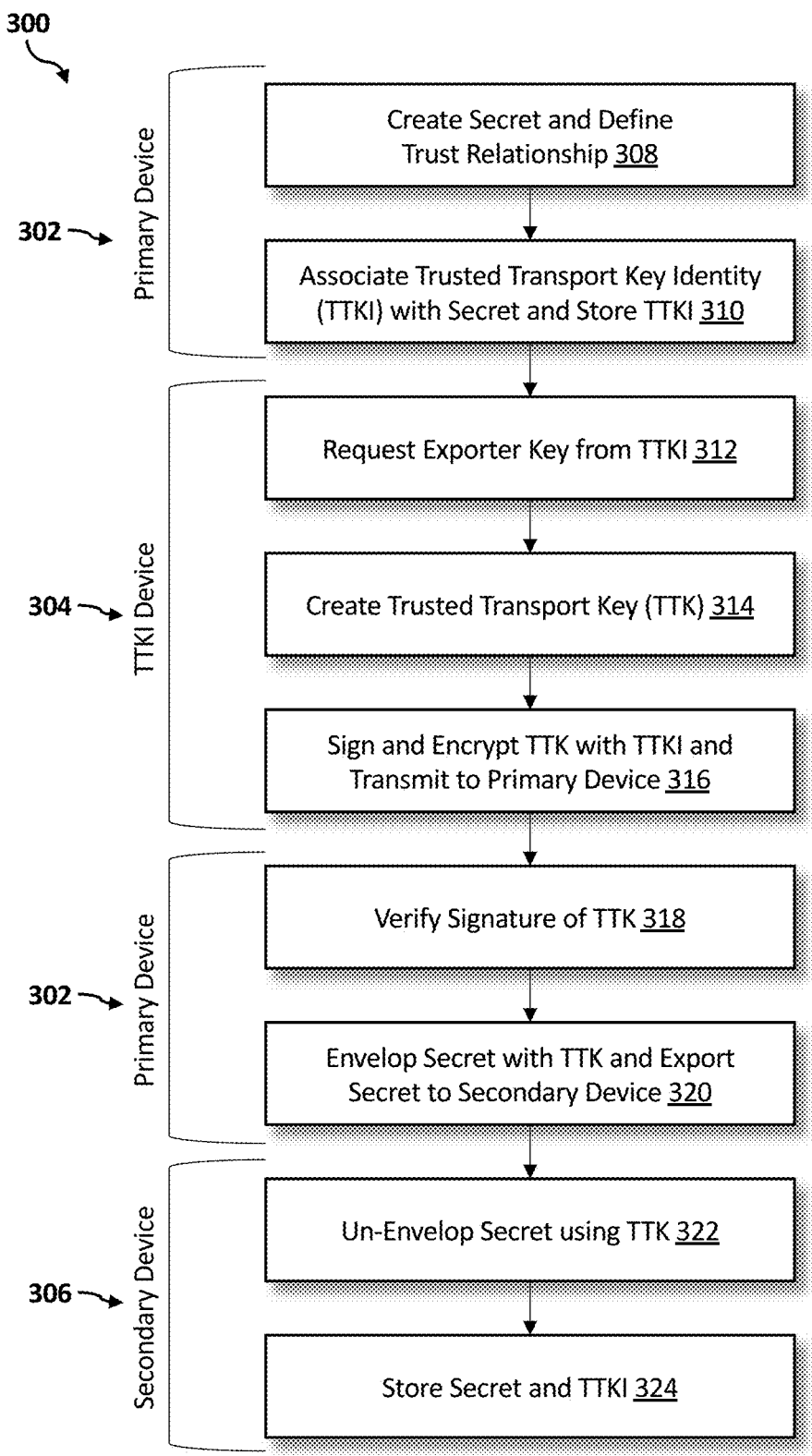
FIG. 3 is an operational flowchart illustrating a process for the trusted transport of secret data according to at least one embodiment.

Referring now to FIG. 3, an operational flowchart illustrating an exemplary trusted transport of secret data process 300 used by the secure transport program 110a, 110b according to at least one embodiment is depicted. The trusted transport of secret data process 300 may operate across multiple devices, such as a primary device 302, a secondary device 306 and a TTKI device 304.

A primary device 302 and a secondary device 306 may include, for example, a computer (e.g., computer 102), a smart phone, smart watch, a tablet or a gaming console. The primary device 302 and the secondary device 306 may be operated by a user, for example, when the user may endorse to have access to a user enveloping key or when a user is defining a trust relationship. A TTKI device 304 may be an authentication device, for example an HSM device. A TTKI device 304 may also include other computing devices. For example, in a personal usage setting, the other computing device may include a computing device that securely stores and runs a TTKI application. Additionally, for example, a smart phone may be an interface to a cloud-based TTKI that may have a secure link to the cloud-based stored TTKI. The TTKI device 304 may be used by a key management program or company.

At 308, a secret is created, and a trust relationship is defined. A secret may be created by a user and the secret may incorporate secret data, for example, personal identification information associated with the user. A secret may include, for example, a user password, username, answer to a security question, biometric data (e.g., facial recognition, retina scan or fingerprint scan) or other personal data related to the user. The secret may also include medical data, deoxyribonucleic acid (DNA) data, a safe combination, personal identification information or personal information of a known person to the user. The secret data may include data that the user deems sensitive and that the user may create to ensure control over the data, the device and the secret. The secret data owner (e.g., the user) may specify which transport key issuers to trust for enveloping operations.

A trust relationship may be defined at the time the secret (e.g., secret 206) is created and stored on a primary device 302. The trust relationship may be used for the transport of secrets from a secure device (i.e., the primary device 302). The secret may not be altered once the secret that defines the trust relationship (e.g., trusts 204) is stored on a secure network.

For example, a user possesses an authentication device to generate an authentication code based on an input. The authentication device may include a smart phone or a personal computing device that has a software application or program to generate an authentication code (e.g., security token or a hash). The input may include user data to access the smart phone, such as biometric features or a passcode. Once access is established to generate an authentication code by the user operating the authentication device, the authentication device may hash the input with a secret key stored on the authentication device to produce a result. The result may include, for example, a passcode or a quick response (QR) code that may be read by a compute device camera.

At 310, a TTKI is associated with the created secret and the TTKI is stored on the primary device 302. The owner of the created secret may specify a set of one or more TTKIs that may be associated with the secret. The association created between the secret and the TTKI may not be modified or removed. TTKIs may be, for example, in the form of a normal X.509 root certificate or a form of data that may be used to subsequently specify an enveloping key issuer (i.e., TTKI). For example, a hash of the TTKI certificate may be used so the actual certificate may not need to be stored on the device (e.g., the primary device 302) in constrained environments. A constrained environment may include, for example, a limited amount of processing memory, a limited amount of non-volatile storage memory, a limited amount of processing power or a limited amount of processing ability.

A TTKI may be used to verify that the owner of transport key is the same owner that issued the enveloping encryption key. Multiple TTKIs may imply that multiple parties have authorization to sign the transport key. For example, when a user enrolls or registers on a device (e.g., primary device 302), the user may carry out a command on the device to internally set the user secret and insert the identification of the TTKI to be associated with the secret. In the current example, the identification is the public key of the TTKI and the private key of the TTKI is stored on a different secure TTKI storage device, such as a user personal smart phone.

At 312, an exporter key is requested from the TTKI device 304. The exporter key may include, for example, the secret or the TTKI being transmitted from the primary device 302 to the TTKI device. The request may be triggered by the user making the request, for example, for authorization. The request may be made from the primary device 302 to the TTKI device 304. The request may be made over a communication network 116. An example of the user making a request or authorizing a request may include the user requesting the primary device 302 to export the secret. The primary device 302 may make the request to the TTKI device 304 on a cloud-based network using the TTKI name. The TTKI on the cloud-based network may require authorization from the user to issue the key directly via a secure network to the user device.

At 314, the trusted transport key (TTK) is created on the TTKI device 304. The TTKI device 304 may generate a TTK using the secure TTKI stored on a storage device. For example, a random key may be generated on a TTKI device 304 and digitally signed with the TTKI asymmetric key. An additional example may include using a key derivation function with an input from both the requester (i.e., the user) and the TTKI.

At 316, the TTK is signed and encrypted with the TTKI, then transmitted from the TTKI device 304 to the primary device 302. A trusted transport key (TTK) may be used to envelop the secret for secure transmission of secret data and sensitive data. The TTK that envelops the secret may also be known as the enveloping key. New enveloping keys may be allowed and introduced to the trust relationship if required. Digital signature verification may use, for example, standard PKI practices. A new enveloping key may be introduced, for example, if the user changes the device that uses and stores the secret.

For example, the user activates and uses the HSM (i.e., TTKI device 304) to generate a TTK and signs the TTK with the TTKI private key. The user transmits the TTK and the digital signature to the primary device 302. The TTK may be digitally signed with a digital certificate and the digital certificate may verify the user identity.

At 318, the signature of the TTK is verified on the primary device 302. The primary device 302 may verify the TTK by checking the digital signature using the TTKI public key.

At 320, the secret is enveloped with the TTK and exported to a secondary device 306. The verified TTK may be used to encrypt or envelop the user secret and to export the enveloped user secret to a different device (e.g., secondary device 306) A secret may be enveloped when, for example, a user of a computing device introduces a transport key that may be signed either directly or indirectly by one of the TTKIs associated with the secret. The transport key may be a public key in a certificate that may be used to encrypt the secret. The public key in a certification may allow the private key owner to decrypt the application secret at the destination. The transport key may include a secret key that the owner of the secret may load into the destination for receiving the transported secrets. The indirect signature may follow normal PKI trust path chain rules.

The secure transport program 110*a*, 110*b* may manage the transport key as appropriate for the transport key type and may maintain the association to the secret as defined in the secure object. The transport key type may be a public key or a secret key. Only a key that may be validated as signed by one of the TTKIs associated with the secret may be used to envelop the secret. The enveloped secret is then transmitted or exported from the primary device 302 to the secondary device 306.

At 322, the secret is unenveloped (i.e., decrypted) using the TTK on the secondary device 306. The TTK and the encrypted data are used to store the user secret in response to decrypting the secret. The TTK may be wrapped in additional security measures or additional encryption keys. The device (e.g., primary device 302 or secondary device 306) may be shared by more than one user by an access control, such as a personal identification number (PIN). The device may have an administrator for enrolling users, however, only the user may export the user secrets.

At 324, the secret and the TTKI are stored on the secondary device 306.

An additional example may include when a user upgrades or switches devices, such as an instance when the user upgrades the user smart phone. The user may enroll the new device by carrying out the previous steps beginning with a command to internally set the user secret, or a new user secret.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
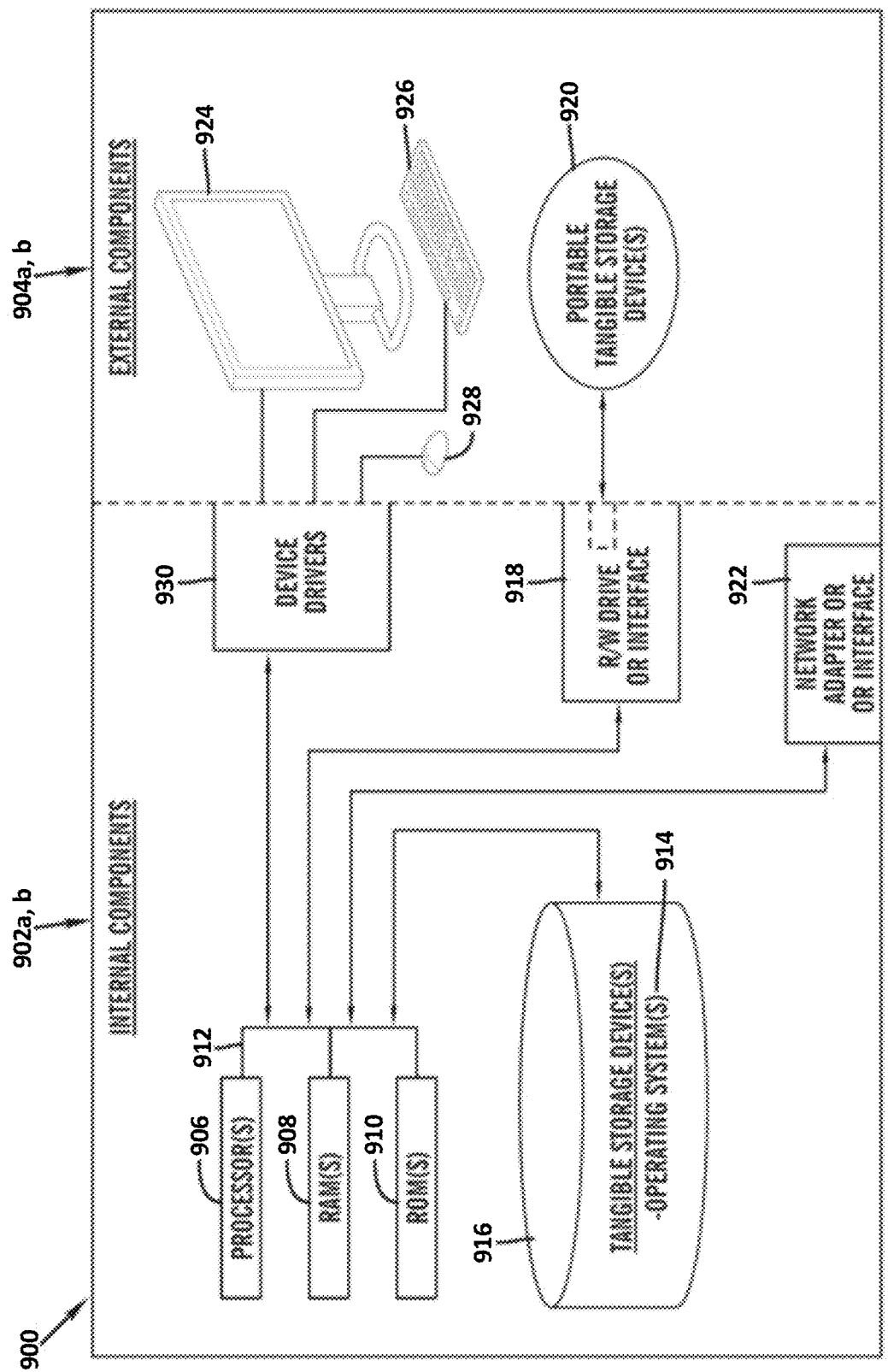
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the secure transport program 110a in client computer 102, and the secure transport program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the secure transport program 110a, 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the secure transport program 110a in client computer 102 and the secure transport program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the secure transport program 110a in client computer 102 and the secure transport program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
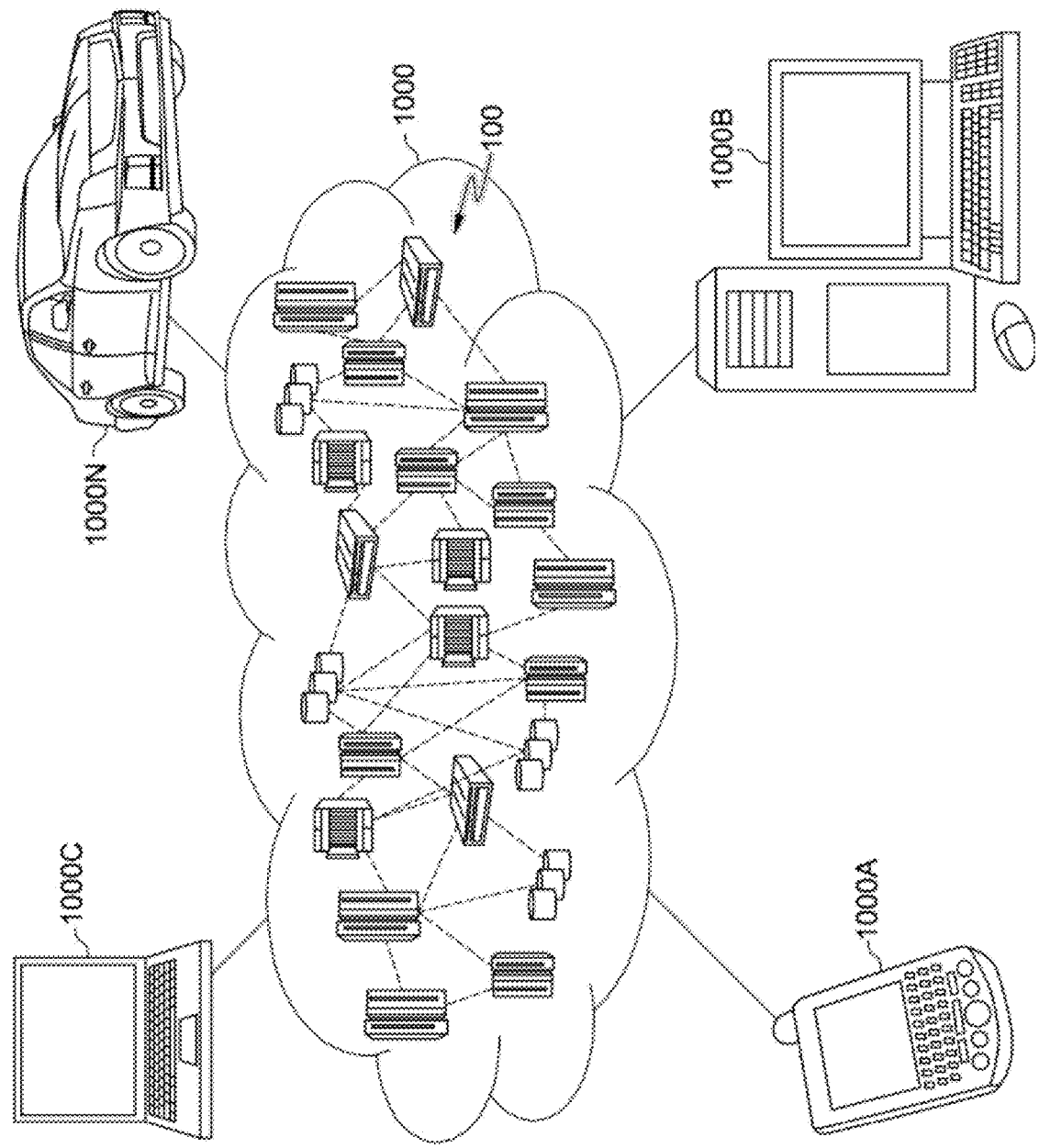
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
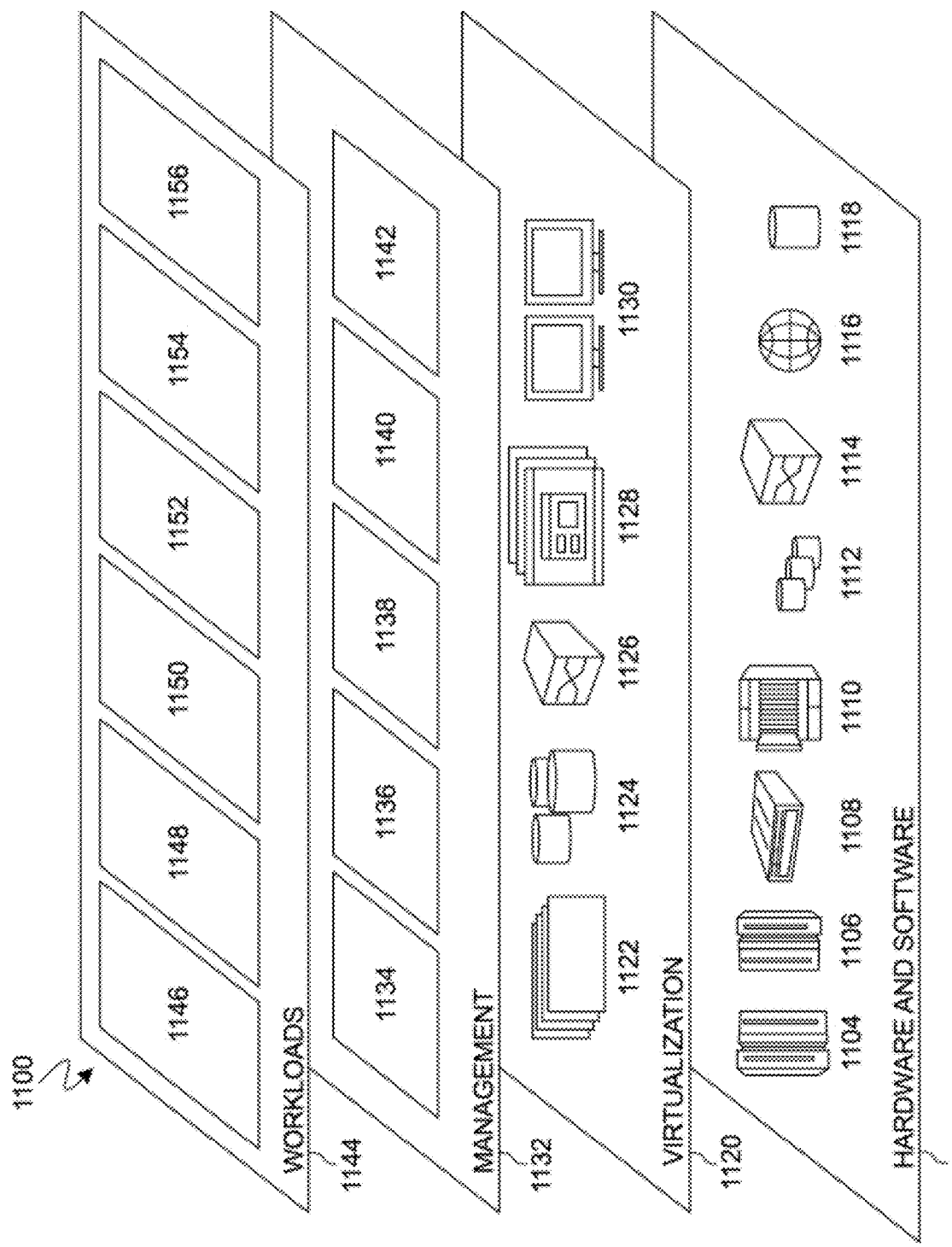
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and secure transport 1156. A secure transport program 110a, 110b provides a way to securely transport secret data using trust relationships and TTKIs to envelop the secret data.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for secure transport of data, the method comprising:
   defining a trust relationship based on a secret, wherein the secret incorporates personal identification information of a user, wherein the secret is unaltered once the secret that defines the trust relationship is stored on a secure network, wherein the trust relationship is created between a trusted transport key (TTK) and the secret that is to be transferred;
   associating a trusted transport key identity (TTKI) based on the defined trust relationship;
   receiving the TTK, wherein the TTK is digitally signed and encrypted with the TTKI, wherein the TTK is associated with the secret, wherein the TTK is acknowledged by the user as a trusted key;
   verifying the digitally signed TTK; and
   enveloping the secret with the TTK.

2. The method of claim 1, further comprising:
   requesting an exporter key from the TTKI;
   signing the TTK with a digital certificate; and
   encrypting the TTK with the TTKI based on the digital certificate.

3. The method of claim 1, wherein the secret is created by the user.

4. The method of claim 1, wherein the trust relationship is defined at the time the secret is created.

5. The method of claim 1, wherein the TTK is associated with the TTKI.

6. The method of claim 1, wherein the trust relationship is identified by the user, wherein the identification of the trust relationship allows issuance of the TTK.

7. The method of claim 1, wherein multiple TTKIs are associated with the secret.

8. A computer system for secure transport of data, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
   defining a trust relationship based on a secret, wherein the secret incorporates personal identification information of a user, wherein the secret is unaltered once the secret that defines the trust relationship is stored on a secure network, wherein the trust relationship is created between a trusted transport key (TTK) and the secret that is to be transferred;
   associating a trusted transport key identity (TTKI) based on the defined trust relationship;
   receiving the TTK, wherein the TTK is digitally signed and encrypted with the TTKI, wherein the TTK is associated with the secret, wherein the TTK is acknowledged by the user as a trusted key;
   verifying the digitally signed TTK; and
   enveloping the secret with the TTK.

9. The computer system of claim 8, further comprising:
   requesting an exporter key from the TTKI;
   signing the TTK with a digital certificate; and
   encrypting the TTK with the TTKI based on the digital certificate.

10. The computer system of claim 8, wherein the secret is created by the user.

11. The computer system of claim 8, wherein the trust relationship is defined at the time the secret is created.

12. The computer system of claim 8, wherein the TTK is associated with the TTKI.

13. The computer system of claim 8, wherein the trust relationship is identified by the user, wherein the identification of the trust relationship allows issuance of the TTK.

14. The computer system of claim 8, wherein multiple TTKIs are associated with the secret.

15. A computer program product for secure transport of data, comprising:
   one or more computer-readable tangible storage media and program instructions stored on at least one of the one or more computer-readable tangible storage media, the program instructions executable by a processor to cause the processor to perform a method comprising:
   defining a trust relationship based on a secret, wherein the secret incorporates personal identification information of a user, wherein the secret is unaltered once the secret that defines the trust relationship is stored on a secure network, wherein the trust relationship is created between a trusted transport key (TTK) and the secret that is to be transferred;
   associating a trusted transport key identity (TTKI) based on the defined trust relationship;
   receiving the TTK, wherein the TTK is digitally signed and encrypted with the TTKI, wherein the TTK is associated with the secret, wherein the TTK is acknowledged by the user as a trusted key;
   verifying the digitally signed TTK; and
   enveloping the secret with the TTK.

16. The computer program product of claim 15, further comprising:
   requesting an exporter key from the TTKI;
   signing the TTK with a digital certificate; and
   encrypting the TTK with the TTKI based on the digital certificate.

17. The computer program product of claim 15, wherein the secret is created by the user.

18. The computer program product of claim 15, wherein the trust relationship is defined at the time the secret is created.

19. The computer program product of claim 15, wherein the TTK is associated with the TTKI.

20. The computer program product of claim 15, wherein the trust relationship is identified by the user, wherein the identification of the trust relationship allows issuance of the TTK.

* * * * *